(12) United States Patent
Kawashima (10) Patent No.: US 7,070,236 B2
(45) Date of Patent: Jul. 4, 2006

(54) AUTOMOBILE SEAT

(75) Inventor: Yoshihito Kawashima, Hiroshima (JP)

(73) Assignee: Delta Kogyo Co., Ltd., Hiroshima (JP)

( * ) Notice: Subject to any disclaimer, the term of this patent is extended or adjusted under 35 U.S.C. 154(b) by 0 days.

(21) Appl. No.: 11/017,885

(22) Filed: Dec. 22, 2004

(65) Prior Publication Data

US 2005/0140190 A1 Jun. 30, 2005

(30) Foreign Application Priority Data

Dec. 24, 2003 (JP) ............................. 2003-427640

(51) Int. Cl.
 B06N 2/42 (2006.01)
 B06N 2/427 (2006.01)
 B60R 21/00 (2006.01)
(52) U.S. Cl. .............................. 297/216.14; 297/216.1; 297/261.13
(58) Field of Classification Search ........... 297/216.14, 297/216.13, 216.15, 216.1, 216.16
 See application file for complete search history.

(56) References Cited

U.S. PATENT DOCUMENTS

| | | | | |
|---|---|---|---|---|
| 5,219,202 A | * | 6/1993 | Rink et al. ............. | 297/216.13 |
| 5,676,421 A | * | 10/1997 | Brodsky ................ | 297/216.13 |
| 5,938,265 A | * | 8/1999 | Oyabu et al. ....... | 297/216.13 X |
| 6,022,074 A | * | 2/2000 | Swedenklef ........... | 297/216.14 |
| 6,024,406 A | * | 2/2000 | Charras et al. ........ | 297/216.14 |
| 6,053,571 A | * | 4/2000 | Faigle .................... | 297/216.13 |
| 6,296,306 B1 | * | 10/2001 | Specht et al. ......... | 297/216.14 |
| 6,409,263 B1 | * | 6/2002 | Seibold ................. | 297/216.13 |
| 6,702,387 B1 | * | 3/2004 | Munemura et al. . | 297/216.13 X |
| 6,709,053 B1 | * | 3/2004 | Humer et al. ....... | 297/216.14 X |
| 6,786,543 B1 | * | 9/2004 | Andersson et al. .... | 297/216.13 |

FOREIGN PATENT DOCUMENTS

| | | |
|---|---|---|
| JP | 2000-118279 | 4/2000 |
| JP | 2001-145538 | 5/2001 |

\* cited by examiner

*Primary Examiner*—Rodney B. White
(74) *Attorney, Agent, or Firm*—Wenderoth, Lind & Ponack, L.L.P.

(57) ABSTRACT

An automobile seat includes a seat cushion and a seat back tiltably mounted on the seat cushion. The automobile seat also includes a seat cushion frame, a side frame mounted on the seat cushion frame, a seat back frame mounted on the side frame so as to be rotatable within a limited angle, and a fastening member mounted on the seat back frame. The side frame has an insertion hole defined therein in which the fastening member is inserted and also has an impact absorbing structure. When a load greater than a predetermined value is inputted to the seat from behind, a lower portion of the seat back frame is pushed upon a rearward movement of a seat occupant to thereby cause the fastening member to move rearward while deforming the impact absorbing structure. As a result, the seat back frame rotates with respect to the side frame, and an impact is absorbed by deformation of the impact absorbing structure.

20 Claims, 9 Drawing Sheets

AUTOMOBILE SEAT

BACKGROUND OF THE INVENTION

1. Field of the Invention

The present invention relates to an automobile seat capable of easing, when an automotive vehicle has come into a rear-end collision, an impact to a lumbar part of a seat occupant.

2. Description of the Related Art

When a rear-end collision has occurred, an impact applied to an automobile body is transmitted to a human body via a seat and may injure an occupant of the seat.

Japanese Laid-Open Patent Publication No. 2000-118279 discloses a seat back frame structure for an automobile seat wherein a horizontal frame having a generally L-shaped cross section extends between lower end portions of opposite side frames. In this seat back frame structure, a plurality of horizontally extending stiffening beads or ridges are formed on a bottom wall and a vertical wall of the horizontal frame, while two vertically extending energy absorbing beads or ridges are formed on the vertical wall of the horizontal frame. The energy absorbing beads are deformed when an impact force is applied thereto in an event of a rear-end collision.

Japanese Laid-Open Patent Publication No. 2001-145538 discloses another seat back frame structure wherein a lower portion of a seat back frame has a impact absorbing portion formed by partially pressing the lower portion into a planar shape so as to have a strength lower than other portions. The strength of the impact absorbing portion is so set that the impact absorbing portion may be deformed when an impact force is applied thereto in an event of, for example, a front-end collision.

The seat back frame structure as disclosed in the above-described patent publications is intended to absorb impact inputted from outside by deforming a portion of the seat back frame, but cannot ensure an amount of deformation sufficient to absorb large impact energy and, hence, there is still room for improvement.

SUMMARY OF THE INVENTION

The present invention has been developed to overcome the above-described disadvantages.

It is accordingly an objective of the present invention to provide an automobile seat having a simple construction and exhibiting high safety that ensures an amount of deformation sufficient to absorb large impact energy.

In accomplishing the above and other objectives, the automobile seat according to the present invention includes a seat cushion and a seat back tiltably mounted on the seat cushion, and also includes a seat cushion frame, a side frame mounted on the seat cushion frame, a seat back frame mounted on the side frame so as to be rotatable within a limited angle, and a fastening member mounted on the seat back frame. The side frame has an insertion hole defined therein in which the fastening member is inserted, and also has an impact absorbing structure. The seat back frame is fixed to the side frame by the fastening member in a normal condition, whereas when a load greater than a predetermined value is inputted from behind, a lower portion of the seat back frame is pushed upon a rearward movement of a seat occupant to thereby cause the fastening member to move rearward while deforming the impact absorbing structure.

As a result, the seat back frame rotates with respect to the side frame, and an impact is absorbed by deformation of the impact absorbing structure.

An amount of rearward movement of the fastening member depends on a magnitude of the load inputted from behind.

The side frame may include an inner side frame interposed between the seat cushion frame and an outer side frame, wherein the impact absorbing structure is formed in the inner side frame.

Conveniently, the impact absorbing structure includes a plurality of impact absorbing holes formed in proximity to the insertion hole for the fastening member.

Alternatively, the impact absorbing structure includes an elongated hole communicating with the insertion hole for the fastening member, wherein the elongated hole has a width less than a diameter of the fastening member.

The insertion hole for the fastening member may be an elongated hole. In this case, the impact absorbing structure includes a ridge formed adjacent the elongated hole, and an engaging member having a side wall confronting the ridge, wherein the fastening member extends through the engaging member.

The automobile seat also includes a head rest mounted on an upper portion of the seat back, wherein the headrest is moved forward upon rotation of the seat back frame.

According to the present invention, the insertion hole for the fastening member and the impact absorbing structure are formed in the side frame, and when a load greater than a predetermined value is inputted to the seat from behind, a lower portion of the seat back frame is pushed upon a rearward movement of a seat occupant to thereby cause the fastening member to move rearward while deforming the impact absorbing structure, thereby absorbing impact. Accordingly, a sufficient amount of deformation that can absorb large impact energy is ensured with a simple construction.

Because the seat back frame rotates relative to the side frame upon a rearward movement of the fastening member, the headrest mounted on the upper portion of the seat back moves forward, thereby making it possible to prevent a neck of the seat occupant from being injured.

BRIEF DESCRIPTION OF THE DRAWINGS

The above and other objectives and features of the present invention will become more apparent from the following description of preferred embodiments thereof with reference to the accompanying drawings, throughout which like parts are designated by like reference numerals, and wherein.

DETAILED DESCRIPTION OF THE PREFERRED EMBODIMENTS

This application is based on an application, No. 2003-427640, filed Dec. 24, 2003 in Japan, the content of which is herein expressly incorporated by reference in its entirety.

An automobile seat according to the present invention includes a seat cushion mounted on a floor of a vehicle body, and a seat back tiltably mounted on the seat cushion.

Embodiment 1

Figure 1:
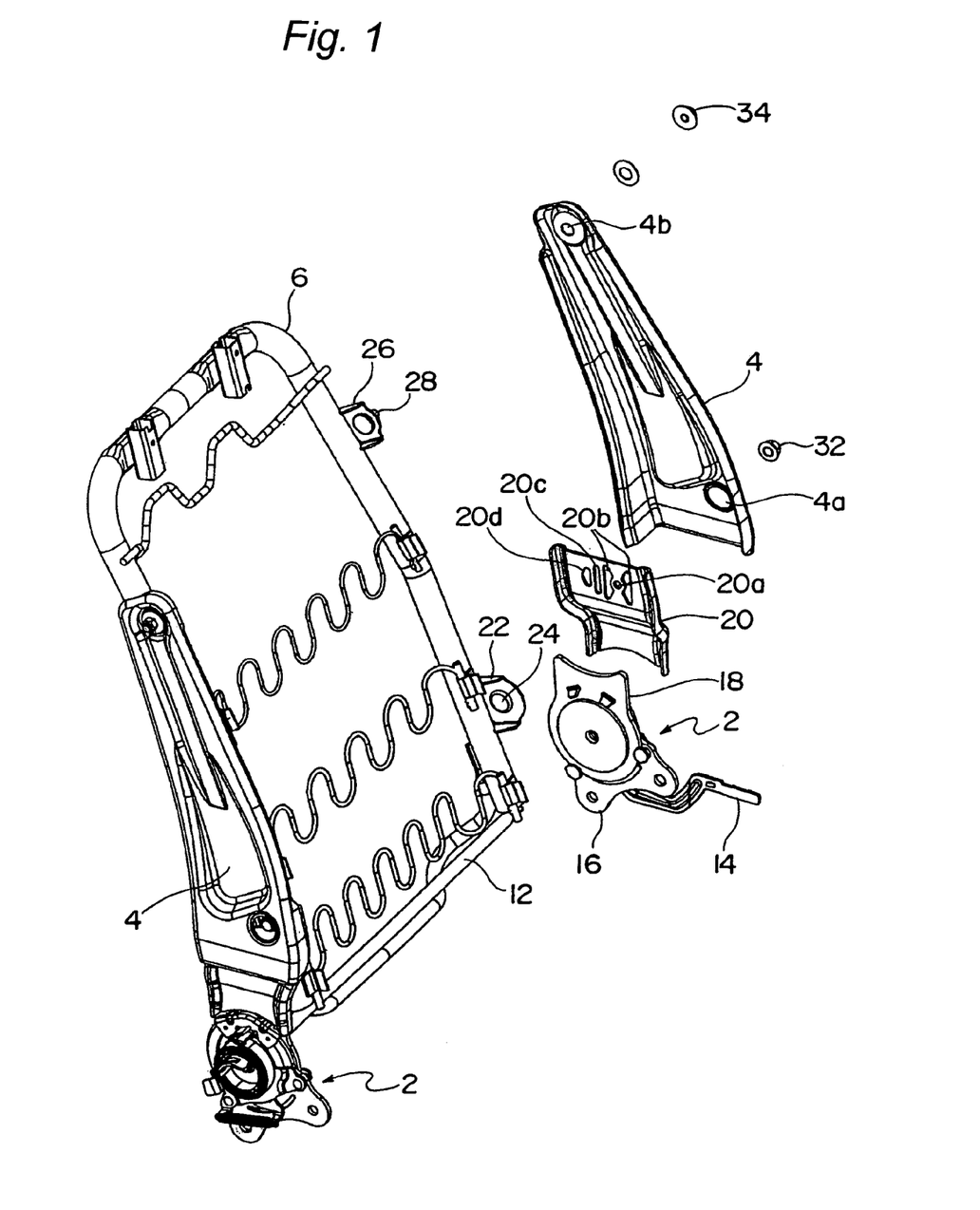
FIG. 1 is an exploded perspective view of a seat back frame assembly of an automobile seat according to a first embodiment of the present invention.

FIG. 1 depicts a seat back frame assembly of an automobile seat according to a first embodiment of the present invention, which is tiltably mounted on a seat cushion frame assembly (not shown). As shown therein, the seat back frame assembly includes a pair of side frames 4 mounted on the seat cushion frame assembly via respective recliner adjusters 2, and a seat back frame 6 mounted on the pair of side frames 4. A headrest 8 (see FIGS. 3A and 3B) is mounted on an upper portion of the seat back frame 6.

The recliner adjusters 2 are connected to each other via a connecting shaft 12. Operation of an operation lever 14 mounted on one of the recliner adjusters 2 allows the side frames 4 to be set to a desired angle.

Each of the recliner adjusters 2 includes a lower bracket 16 secured to the seat cushion frame assembly, and an upper bracket 18 rotatable relative to the lower bracket 16. Because the present invention does not focus on the recliner adjusters 2, detailed description thereof is omitted.

An inner side frame 20 is secured to the upper bracket 18 and has a bolt insertion hole 20a defined therein in which a bolt (explained later) secured to the seat back frame 6 is loosely inserted. The side frame 4 is joined to an upper portion of the inner side frame 20 and has a nut insertion hole 4a defined therein at a location confronting the bolt insertion hole 20a in the inner side frame 20. The side frame 4 also has a bolt insertion hole 4b defined therein in which a bolt (explained later), that acts as a center of rotation of the seat back frame 6, is loosely inserted.

On the other hand, the seat back frame 6 includes a bracket 22 secured thereto at a location confronting the bolt insertion hole 20a in the inner side frame 20, and a first bolt 24 employed as a fastening member and secured to the bracket 22 so as to protrude toward the bolt insertion hole 20a. The seat back frame 6 also includes another bracket 26 secured thereto at a location confronting the bolt insertion hole 4b in the side frame 4, and a second bolt 28 secured to the bracket 26 so as to protrude toward the bolt insertion hole 4b. As explained later, the second bolt 28 acts as a center of rotation about which the seat back frame 6 rotates within a limited angle.

Figure 2A:
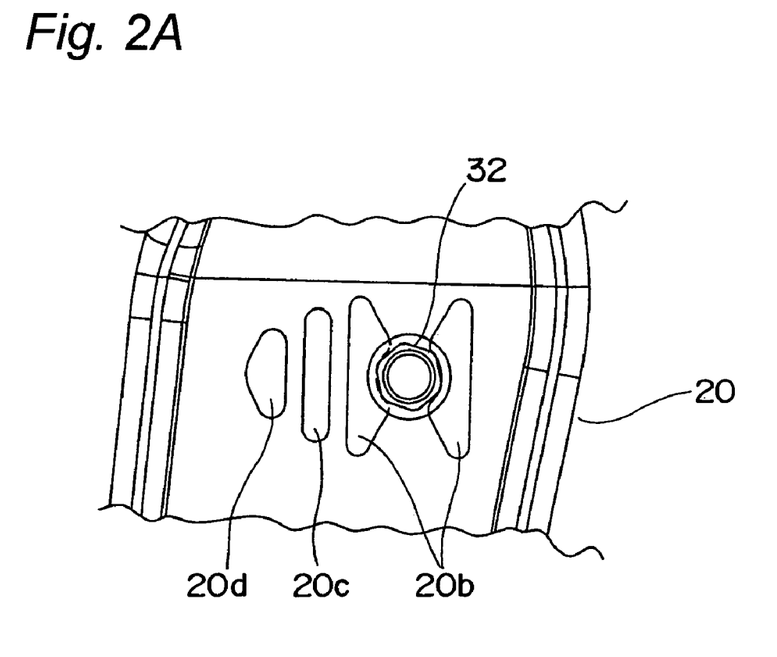
FIG. 2A is a front view of an impact absorbing structure provided in the seat back frame assembly of FIG. 1.

As shown in FIG. 2A, the inner side frame 20 also has a pair of (front and rear) first impact absorbing holes 20b defined therein on respective sides of the bolt insertion hole 20a in a symmetrical fashion. Each of the first impact absorbing holes 20b has a generally arcuate side edge formed along the bolt insertion hole 20a. An elongated second impact absorbing hole 20c is formed rearwardly of a rear one of the first impact absorbing holes 20b, and a third impact absorbing hole 20d is formed rearwardly of the second impact absorbing hole 20c. A rear edge of the rear one of the first impact absorbing holes 20b, front and rear edges of the second impact absorbing hole 20c, and a front edge of the third impact absorbing hole 20d extend substantially straight. An interval between the rear one of the first impact absorbing holes 20b and the second impact absorbing hole 20c is set to be approximately equal to an interval between the second and third impact absorbing holes 20c, 20d. A rear edge of the third impact absorbing hole 20d is formed so as to protrude rearwardly.

When the seat back frame 6 is mounted on the side frame 4 and the inner side frame 20, the first bolt 24 is inserted into the bolt insertion hole 20a in the inner side frame 20, while the second bolt 28 is inserted into the bolt insertion hole 4b in the side frame 4. Thereafter, a first nut 32 is screwed onto the first bolt 24 through the nut insertion hole 4a in the side frame 4, while a second nut 34 is similarly screwed onto the second bolt 28.

In a normal condition, because the first and second bolts 24, 28 secured to the seat back frame 6 are inserted into the bolt insertion hole 20a in the inner side frame 20 and into the bolt insertion hole 4b in the side frame 4, respectively, the seat back frame 6 is fixed to the side frame 4, and an upper part of a user's body is supported by the seat back frame 6. In this condition, the headrest 8 mounted on the upper portion of the seat back frame 6 is spaced a predetermined distance away from the user's head, as best shown in FIG. 3A.

Figure 2B:
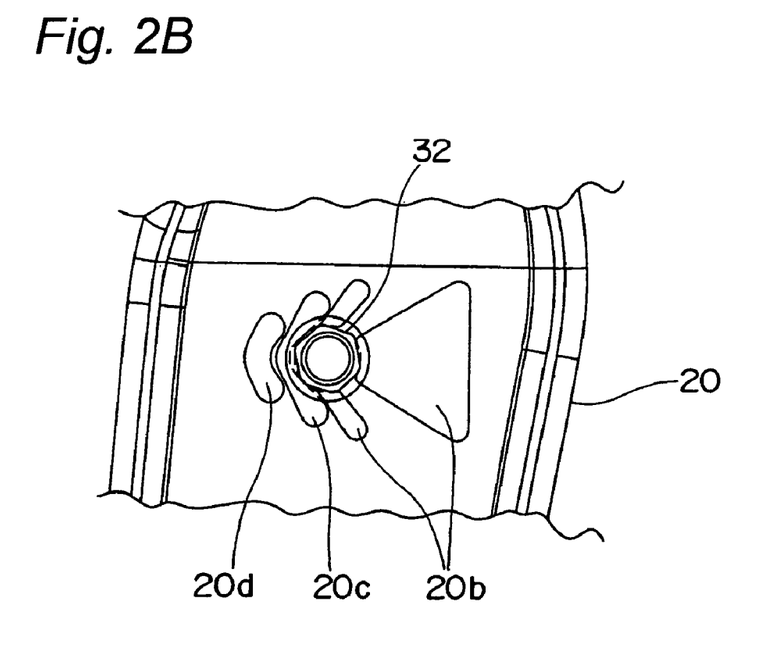
FIG. 2B is a front view of the impact absorbing structure, particularly depicting a case where a load greater than a predetermined value has been inputted to the automobile seat from behind.

On the other hand, when a load greater than a predetermined value is inputted to the seat from behind in an event of, for example, a rear-end collision, the user's body is pressed to the seat back. At this moment, a rearward movement of the user's body causes a lumbar part to push a lower portion of the seat back frame 6 rearwards, and the first, second, and third impact absorbing holes 20b, 20c, 20d formed adjacent to the bolt insertion hole 20a are deformed to absorb an impact. An amount of deformation depends on a magnitude of the impact, and the first impact absorbing holes 20b, the second impact absorbing hole 20c, and the third impact absorbing hole 20d are deformed in this order depending on the magnitude of the impact.

Upon deformation of the first, second, and third impact absorbing holes 20b, 20c, 20d, the first bolt 24 moves rearward. Accordingly, the seat back frame 6 rotates with the second bolt 28 as a center of rotation, and the headrest 8 moves toward the user's head to support it.

Figure 3A:
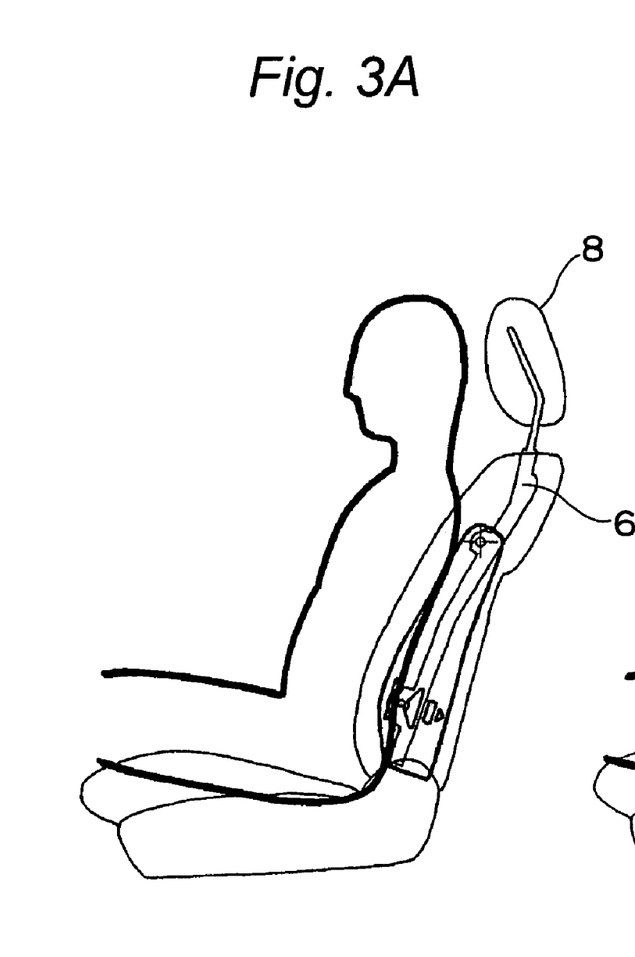
FIG. 3A is a side view of the automobile seat in a normal condition.
Figure 3B:
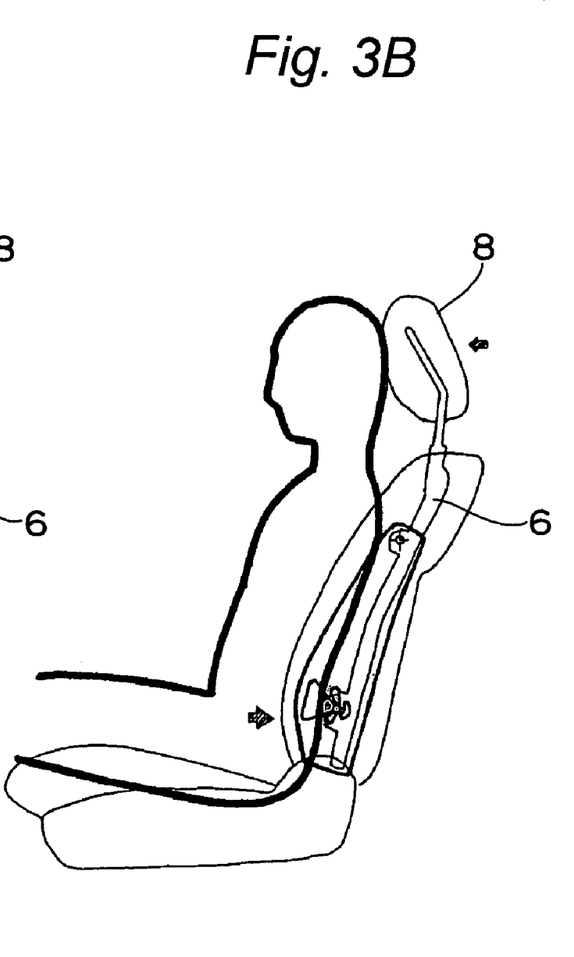
FIG. 3B is a view similar to FIG. 3A, but depicting a case where a load greater than a predetermined value has been inputted to the automobile seat from behind.
Figure 4:
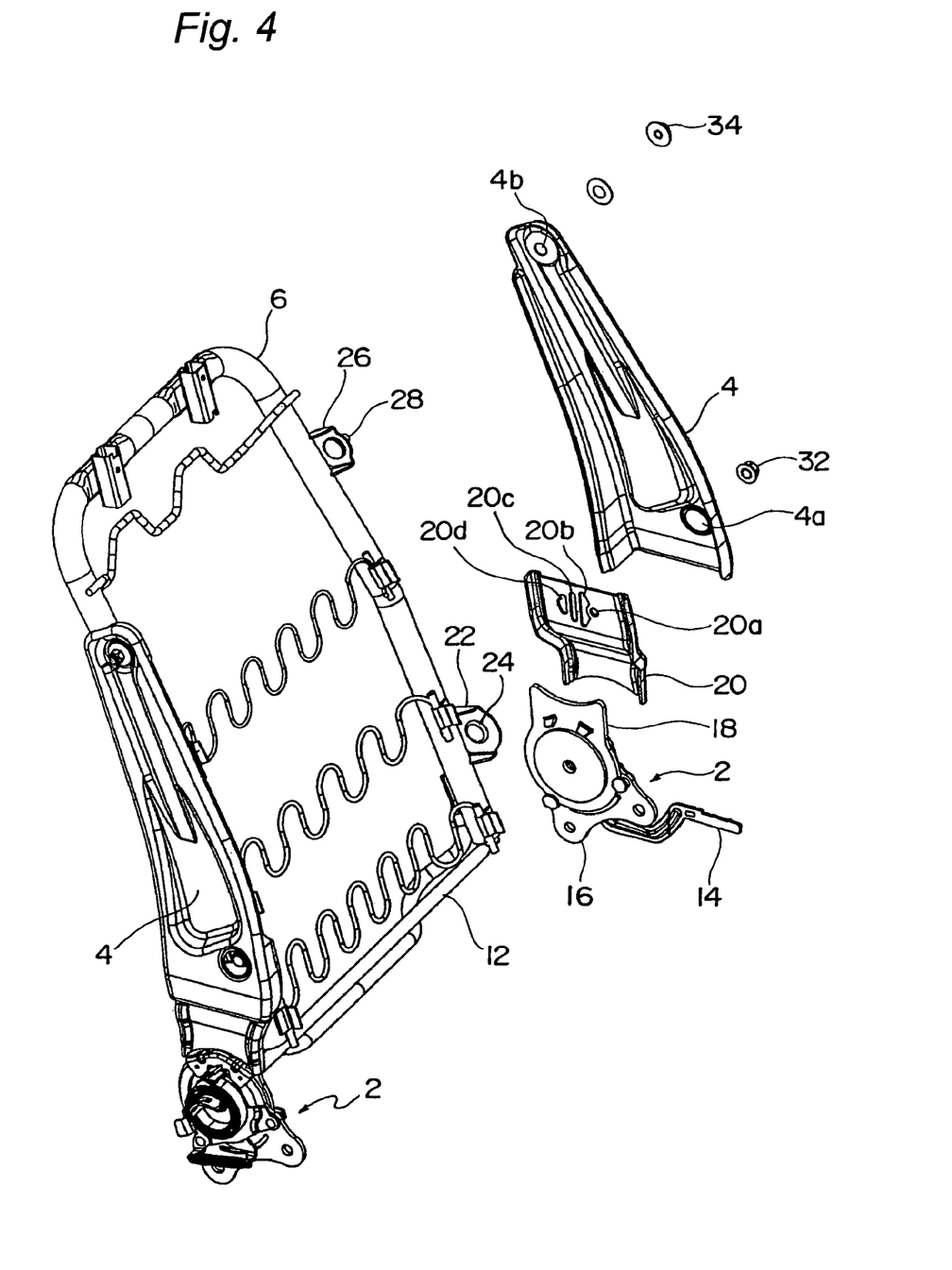
FIG. 4 is an exploded perspective view of a seat back frame assembly of an automobile seat according to a second embodiment of the present invention.

FIG. 3A depicts a normal condition, while FIG. 3B depicts a condition in which the seat back frame 6 and the headrest 8 have been shifted in the event of a rear-end collision.

An interval between the first bolt 24 and the second bolt 28 is set to be greater than a vertical interval between the second bolt 28 and the headrest 8 and, hence, even if a load of the user's head has been applied to the headrest 8 with a slight delay after the rear-end collision, a load which can return the lumbar part is not produced, and the headrest 8 remains at a frontmost position, thereby making it possible to positively support the user's head.

It is to be noted here that although in the above-described embodiment the bolt insertion hole 20a into which the first bolt 24 is inserted is formed in the inner side frame 20, the bolt insertion hole may be formed in a portion of the side frame with which the inner side frame has been integrally formed, and the first, second, and third impact absorbing holes are formed in proximity to such a bolt insertion hole.

Embodiment 2

FIG. 4 and FIGS. 5A to 5C depict a seat back frame assembly of an automobile seat according to a second embodiment of the present invention. Of a pair of first impact absorbing holes 20b formed on respective sides of the bolt insertion hole 20a in the first embodiment referred to above, a front one of the first impact absorbing holes 20b is dispensed with in this embodiment.

Figure 5A:
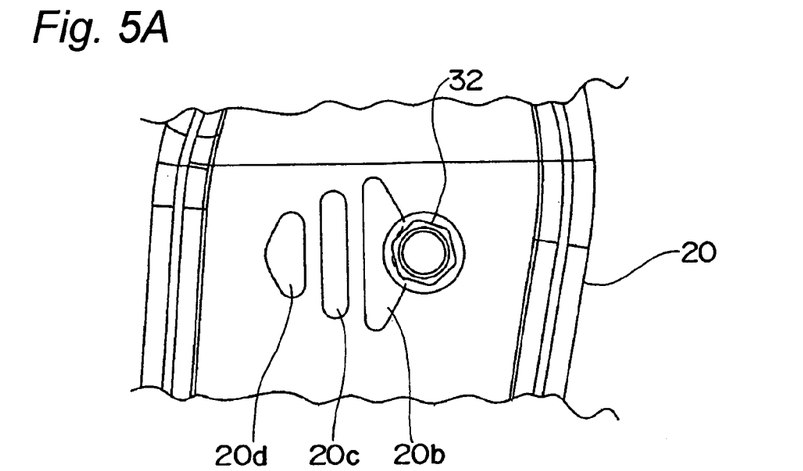
FIG. 5A is a front view of an impact absorbing structure provided in the seat back frame assembly of FIG. 4.
Figure 5B:
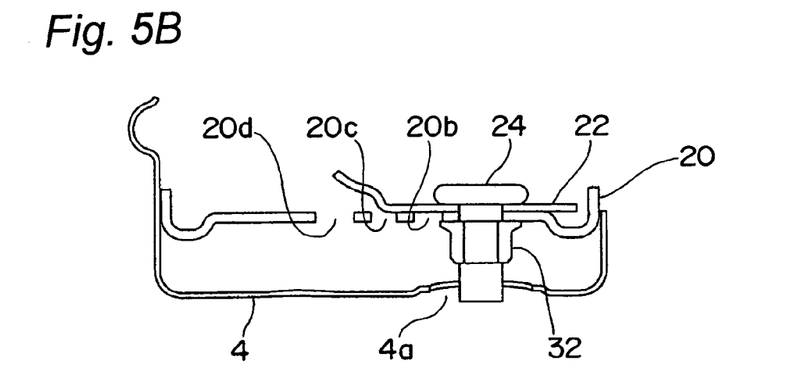
FIG. 5B is a cross sectional view of the impact absorbing structure of FIG. 5A.
Figure 5C:
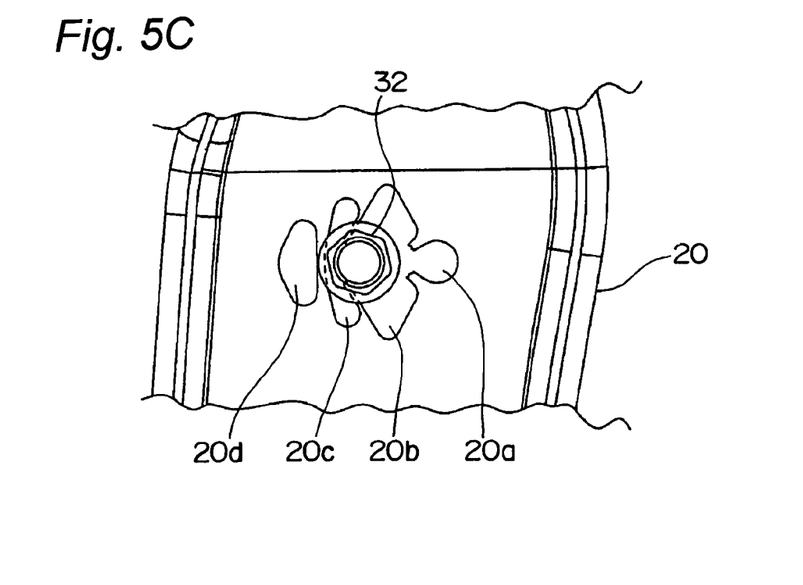
FIG. 5C is a front view of the impact absorbing structure, particularly depicting a case where a load greater than a predetermined value has been inputted to the automobile seat from behind.

By this construction, when a load greater than a predetermined value is inputted to the seat from behind in an event of, for example, a rear-end collision, a portion of inner side frame 20 that is positioned between the bolt insertion hole 20a and first impact absorbing hole 20b splits. Thereafter, first bolt 24 further moves rearward and deforms second impact absorbing hole 20c or both the second and third impact absorbing holes 20c, 20d to absorb an impact, as best shown in FIG. 5C. As is the case with the first embodiment, an amount of deformation depends on a magnitude of the impact, and the first impact absorbing hole 20b, the second impact absorbing hole 20c, and the third impact absorbing hole 20d are deformed in this order depending on the magnitude of the impact.

Upon deformation of the first, second, and third impact absorbing holes 20b, 20c, 20d, the first bolt 24 moves rearward. Accordingly, seat back frame 6 rotates with the second bolt 28 as a center of rotation, and headrest 8 moves toward a user's head to support it (see FIGS. 3A and 3B).

It is to be noted here that although in the above-described embodiment the bolt insertion hole 20a into which the first bolt 24 is inserted is formed in the inner side frame 20, the bolt insertion hole may be formed in a portion of a side frame with which the inner side frame has been integrally formed, and the first, second, and third impact absorbing holes are formed in proximity to such a bolt insertion hole.

Embodiment 3

FIG. 6 and FIGS. 7A to 7C depict a seat back frame assembly of an automobile seat according to a third embodiment of the present invention.

Figure 6:
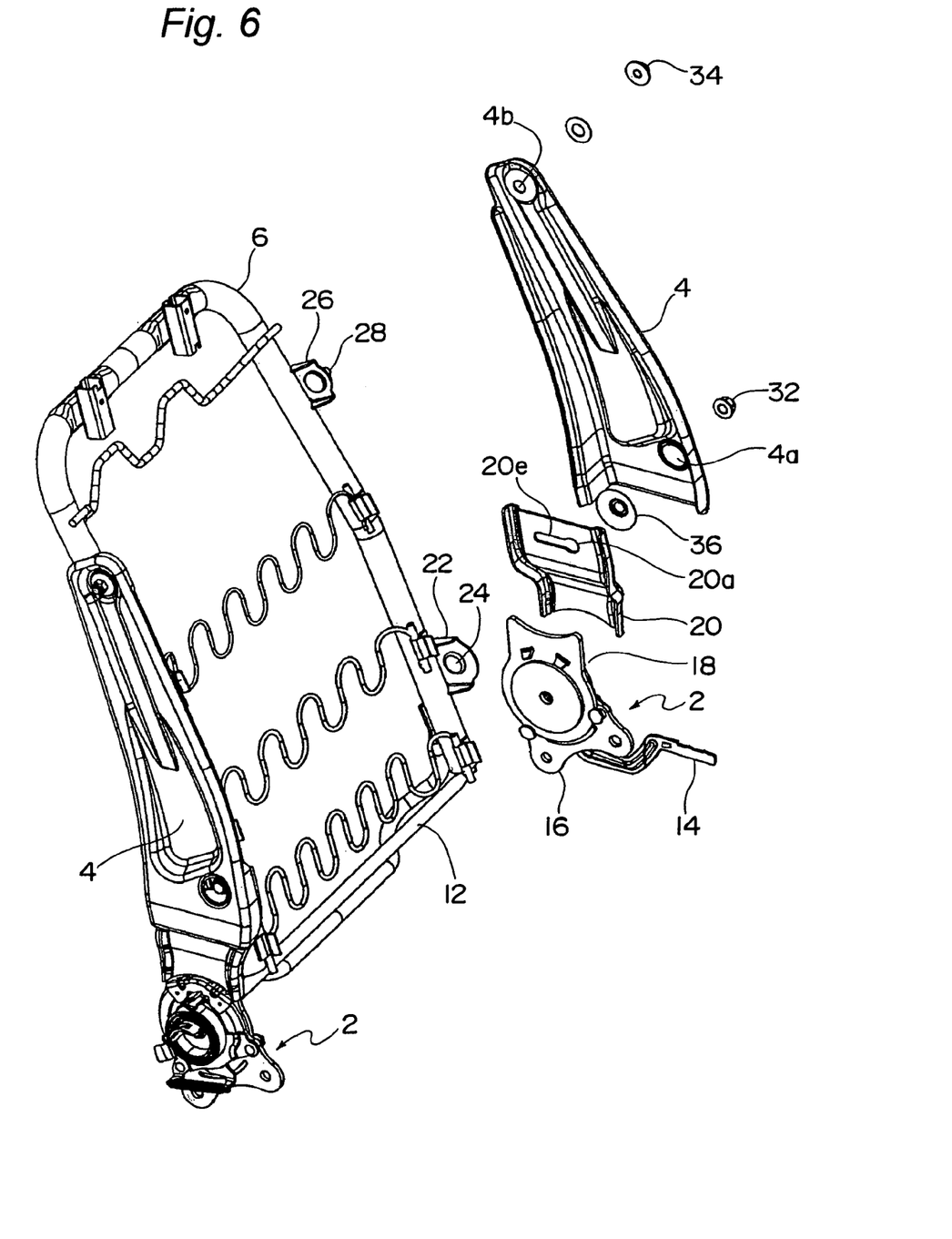
FIG. 6 is an exploded perspective view of a seat back frame assembly of an automobile seat according to a third embodiment of the present invention.
Figure 7A:
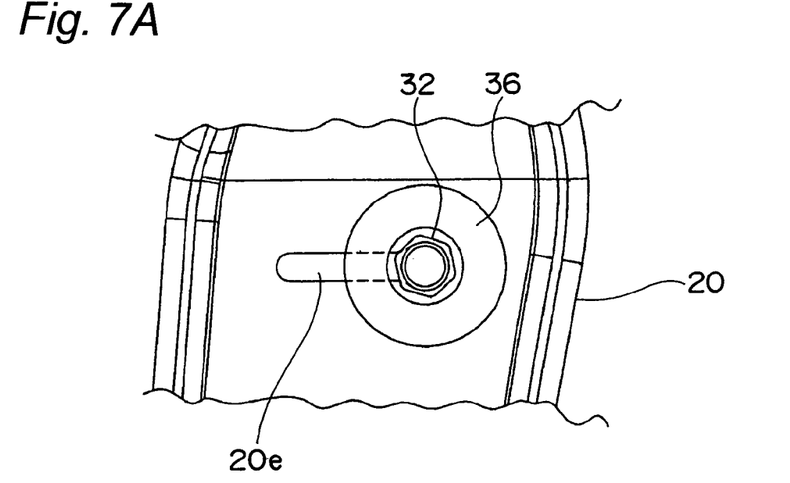
FIG. 7A is a front view of an impact absorbing structure provided in the seat back frame assembly of FIG. 6.
Figure 7B:
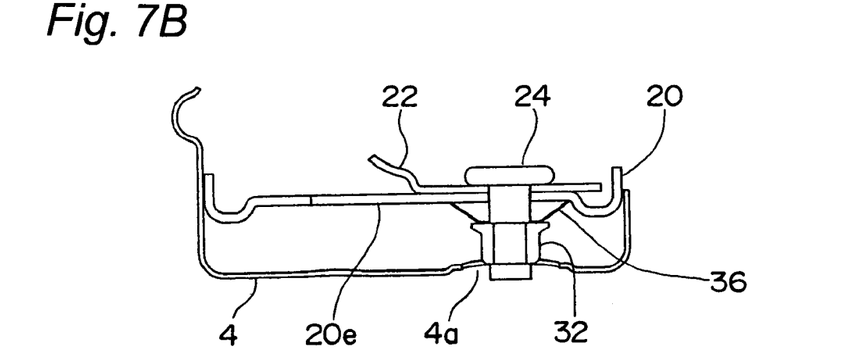
FIG. 7B is a cross sectional view of the impact absorbing structure of FIG. 7A.

As shown in these figures, inner side frame 20 has an elongated hole 20e defined therein rearwardly of bolt insertion hole 20a so as to extend generally horizontally and communicate with the bolt insertion hole 20a. A width of the elongated hole 20e is less than a diameter of first bolt 24 inserted into the bolt insertion hole 20a. A coned disc spring 36 is mounted on the first bolt 24 between the inner side frame 20 and first nut 32.

Figure 7C:
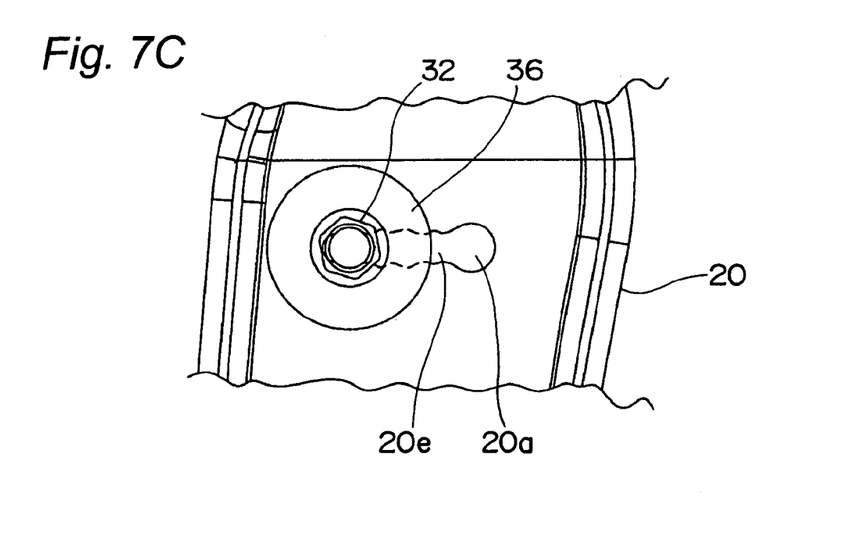
FIG. 7C is a front view of the impact absorbing structure, particularly depicting a case where a load greater than a predetermined value has been inputted to the automobile seat from behind.

Because the width of the elongated hole 20e is set to be less than the diameter of the first bolt 24, when a load greater than a predetermined value is inputted to the seat from behind in an event of, for example, a rear-end collision, the first bolt 24 moves rearward while widening the elongated hole 20e behind it, as best shown in FIG. 7C, and an impact is absorbed by deformation of the elongated hole 20e. That is, the elongated hole 20e acts as an impact absorbing hole in the event of the rear-end collision and also as a guide groove when the first bolt 24 moves rearward. A position at which the first bolt 24 stops in the elongated hole 20e differs depending on a magnitude of an impact, and the greater the impact, the greater an amount of intrusion of the first bolt 24 into the elongated hole 20e.

Upon deformation of the elongated hole 20e, the first bolt 24 moves rearward. Accordingly, seat back frame 6 rotates with second bolt 28 as a center of rotation, and headrest 8 moves toward a user's head to support it (see FIGS. 3A and 3B).

It is to be noted here that although in the above-described embodiment the bolt insertion hole 20a into which the first bolt 24 is inserted is formed in the inner side frame 20, the bolt insertion hole may be formed in a portion of a side frame with which the inner side frame has been integrally formed, and the bolt insertion hole together with an elongated hole communicating therewith is formed in a portion of the side frame.

Embodiment 4

FIG. 8 and FIGS. 9A to 9D depict a seat back frame assembly of an automobile seat according to a fourth embodiment of the present invention.

Figure 8:
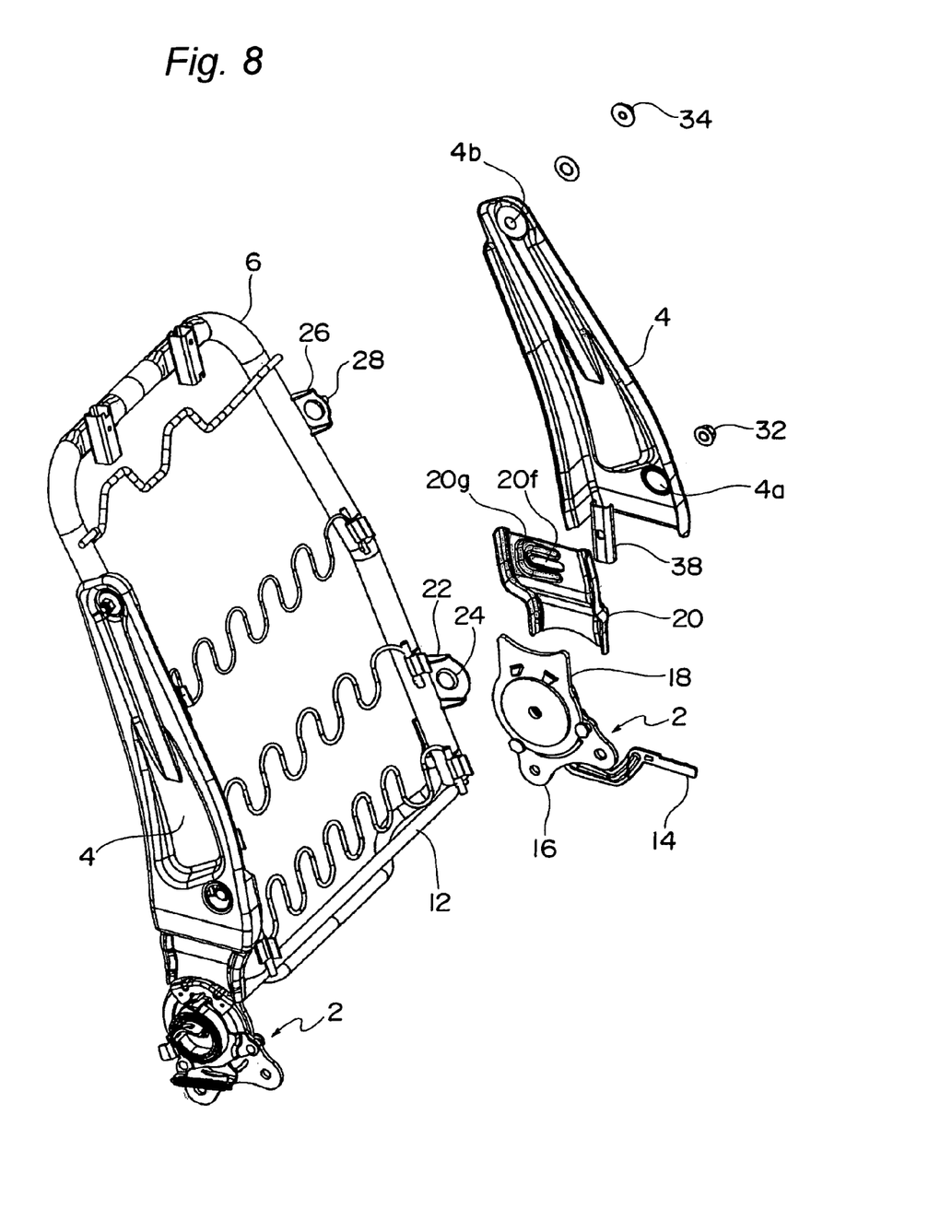
FIG. 8 is an exploded perspective view of a seat back frame assembly of an automobile seat according to a fourth embodiment of the present invention.
Figure 9A:
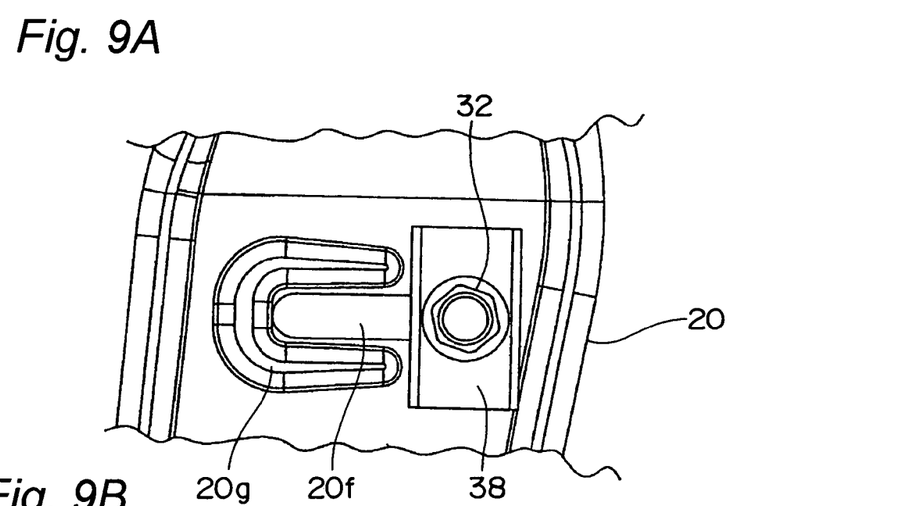
FIG. 9A is a front view of an impact absorbing structure provided in the seat back frame assembly of FIG. 8.

As shown in these figures, inner side frame 20 has an elongated hole or guide groove 20f defined therein so as to extend generally horizontally, into which first bolt 24 is inserted. A generally U-shaped ridge 20g is formed on an outer surface of the inner side frame 20 so as to extend forward from behind the elongated hole 20f along respective sides thereof to surround it. The ridge 20g has a height that gradually decreases forwardly and acts as a stopper for an engaging member explained later.

Figure 9B:
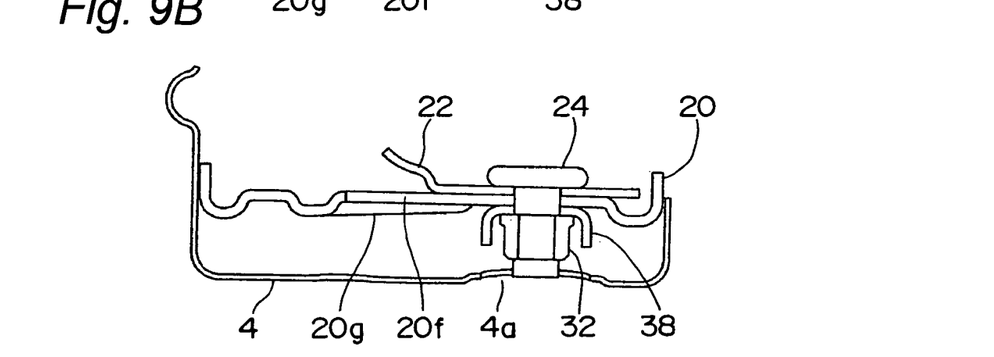
FIG. 9B is a cross sectional view of the impact absorbing structure of FIG. 9A.

The first bolt 24 inserted into a front portion of the elongated hole 20f extends through a generally rectangular engaging member 38 interposed between side frame 4 and the inner side frame 20, and first nut 32 is screwed onto the first bolt 24. The engaging member 38 has a generally U-shaped cross section as shown in FIG. 9B and, hence, has two vertically extending side walls. A rear side wall of the engaging member 38 confronts front ends of the ridge 20g located behind it.

Figure 9C:
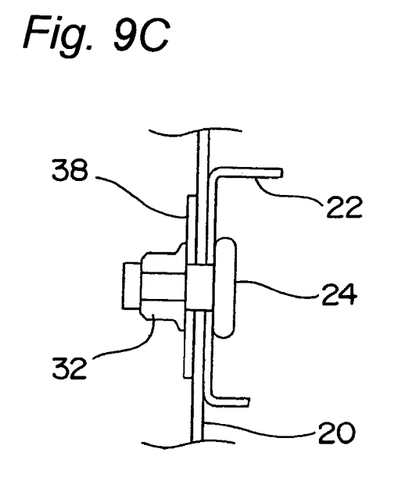
FIG. 9C is another cross sectional view of the impact absorbing structure of FIG. 9A.

In a normal condition, as shown in FIGS. 9A to 9C, the rear side wall of the engaging member 38 is spaced slightly from front ends of the ridge 20g, and the engaging member 38 is held at such position by virtue of a fastening force of the first bolt 24 and the first nut 32. In this condition, when a load greater than a predetermined value is inputted to the seat from behind in an event of, for example, a rear-end collision, the rear side wall of the engaging member 38 impinges on the ridge 20g first and subsequently climbs up onto the ridge 20g, followed by outward bending of upper and lower end portions of the engaging member 38, thereby absorbing an impact.

Figure 9D:
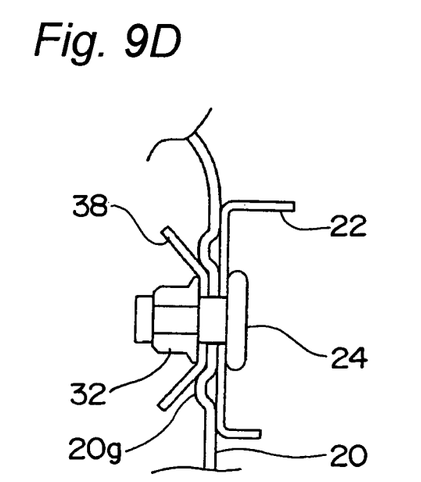
FIG. 9D is a view similar to FIG. 9C, but depicting a case where a load greater than a predetermined value has been inputted to the automobile seat from behind.

Because the ridge 20g inclines so as to have a rearwardly increasing height, a position at which the engaging member 38 stops on the ridge 20g differs depending on a magnitude of the impact, and the greater the impact, the more the engaging member 38 climbs up onto the ridge 20g.

Upon deformation of the engaging member 38, the first bolt 24 moves rearward. Accordingly, seat back frame 6 rotates with second bolt 28 as a center of rotation, and headrest 8 moves toward a user's head to support it (see FIGS. 3A and 3B).

It is to be noted here that although in the above-described embodiment the elongated hole 20f into which the first bolt 24 is inserted is formed in the inner side frame 20, the elongated hole may be formed in a portion of a side frame with which the inner side frame has been integrally formed, and a generally U-shaped ridge is formed around the hole.

Although the present invention has been fully described by way of examples with reference to the accompanying drawings, it is to be noted here that various changes and modifications will be apparent to those skilled in the art. Therefore, unless such changes and modifications otherwise depart from the spirit and scope of the present invention, they should be construed as being included therein.

What is claimed is:

1. An automobile seat having a seat cushion and a seat back tiltably mounted on the seat cushion, comprising:
    a seat cushion frame;
    a side frame mounted on said seat cushion frame;
    a seat back frame mounted on said side frame so as to be rotatable within a limited angle; and
    a fastening member mounted on said seat back frame, with said side frame having an insertion hole defined therein through which said fastening member is to be inserted, and with said side frame also having an impact absorbing structure, said impact absorbing structure including
        (i) a first impact absorbing hole positioned rearwardly of said insertion hole,
        (ii) a second impact absorbing hole positioned rearwardly of said first impact absorbing hole, and
        (iii) a third impact absorbing hole positioned rearwardly of said second impact absorbing hole,
    wherein said seat back frame and said side frame are constructed and arranged such that
        (i) in a normal condition said seat back frame is fixed to said side frame by said fastening member, and
        (ii) when a load greater than a predetermined value is inputted from behind, a lower portion of said seat back frame is pushed upon a rearward movement of a seat occupant to thereby cause said fastening member to move rearwardly while deforming said impact absorbing structure, thus causing said seat back frame to rotate with respect to said side frame while absorbing an impact.

2. The automobile seat according to claim 1, wherein an amount of rearward movement of said fastening member depends on a magnitude of the load inputted from behind.

3. The automobile seat according to claim 2, wherein said side frame includes an inner side frame member and an outer side frame member, with said inner side frame member being interposed between said seat cushion frame and said outer side frame member, and with said impact absorbing structure being formed in said inner side frame member.

4. The automobile seat according to claim 3, further comprising:
    a headrest mounted on an upper portion of said seat back frame, wherein said headrest is movable in a forward direction upon rotation of said seat back frame.

5. The automobile seat according to claim 4, wherein said impact absorbing structure further includes another first impact absorbing hole positioned forwardly of said insertion hole.

6. The automobile seat according to claim 1, wherein said side frame includes an inner side frame member and an outer side frame member, with said inner side frame member being interposed between said seat cushion frame and said outer side frame member, and with said impact absorbing structure being formed in said inner side frame member.

7. The automobile seat according to claim 6, further comprising:
    a headrest mounted on an upper portion of said seat back frame, wherein said headrest is movable in a forward direction upon rotation of said seat back frame.

8. The automobile seat according to claim 6, wherein said impact absorbing structure further includes another first impact absorbing hole formed forwardly of said insertion hole.

9. The automobile seat according to claim 1, further comprising:
    a headrest mounted on an upper portion of said seat back frame, wherein said headrest is movable in a forward direction upon rotation of said seat back frame.

10. The automobile seat according to claim 1, wherein said impact absorbing structure further includes another first impact absorbing hole positioned forwardly of said insertion hole.

11. An automobile seat having a seat cushion and a seat back tiltably mounted on the seat cushion, comprising:
    a seat cushion frame;
    a side frame mounted on said seat cushion frame;
    a seat back frame mounted on said side frame so as to be rotatable within a limited angle; and
    a fastening member mounted on said seat back frame, with said side frame having an elongated insertion hole defined therein in which said fastening member is to be inserted, with said side frame also having an impact absorbing structure including
        (i) a generally U-shaped ridge formed adjacent said elongated insertion hole, and
        (ii) an engaging member having a side wall confronting said generally U-shaped ridge, with said fastening member extending through said engaging member,
    wherein said seat back frame and said side frame are constructed and arranged such that
        (i) in a normal condition said seat back frame is fixed to said side frame by said fastening member, and
        (ii) when a load greater than a predetermined value is inputted from behind, a lower portion of said seat back frame is pushed upon a rearward movement of a seat occupant to thereby cause said fastening member to move rearwardly so as to deform said impact absorbing structure, thus causing said seat back frame to rotate with respect to said side frame while absorbing an impact.

12. The automobile seat according to claim 11, wherein said generally U-shaped ridge has a height that gradually decreases in a forward direction and acts as a stopper for said engaging member.

13. The automobile seat according to claim 12, wherein an amount of rearward movement of said fastening member depends on a magnitude of the load inputted from behind.

14. The automobile seat according to claim 13, wherein said side frame includes an inner side frame member and an outer side frame member, with said inner side frame member being interposed between said seat cushion frame and said outer side frame member, and with said generally U-shaped ridge being formed integral with said inner side frame member.

15. The automobile seat according to claim 14, further comprising:
a headrest mounted on an upper portion of said seat back frame, wherein said headrest is movable in a forward direction upon rotation of said seat back frame.

16. The automobile seat according to claim 11, wherein said side frame includes an inner side frame member and an outer side frame member, with said inner side frame member being interposed between said seat cushion frame and said outer side frame member, and with said generally U-shaped ridge being formed integral with said inner side frame member.

17. The automobile seat according to claim 16, further comprising:
a headrest mounted on an upper portion of said seat back frame, wherein said headrest is movable in a forward direction upon rotation of said seat back frame.

18. The automobile seat according to claim 16, wherein said generally U-shaped ridge has a height that gradually decreases in a forward direction and acts as a stopper for said engaging member.

19. The automobile seat according to claim 11, wherein an amount of rearward movement of said fastening member depends on a magnitude of the load inputted from behind.

20. The automobile seat according to claim 11, further comprising:
a headrest mounted on an upper portion of said seat back frame, wherein said headrest is movable in a forward direction upon rotation of said seat back frame.

* * * * *